(12) United States Patent
Hilzendegen et al.

(10) Patent No.: US 8,960,639 B2
(45) Date of Patent: Feb. 24, 2015

(54) SOLENOID VALVE

(71) Applicant: Hydac Fluidtechnick GmbH, Sulzbach/Saar (DE)

(72) Inventors: Philipp Hilzendegen, Weiskirchen (DE); Franz-Rudolf Hell, Lebach (DE); Andreas Bereschka, Bousbach (FR)

(73) Assignee: Hydac Fluidtechnik GmbH, Sulzbach/Saar (DE)

( * ) Notice: Subject to any disclaimer, the term of this patent is extended or adjusted under 35 U.S.C. 154(b) by 0 days.

(21) Appl. No.: 13/960,294

(22) Filed: Aug. 6, 2013

(65) Prior Publication Data
US 2013/0313453 A1 Nov. 28, 2013

Related U.S. Application Data

(63) Continuation of application No. 13/261,220, filed as application No. PCT/EP2010/005241 on Aug. 26, 2010, now abandoned.

(30) Foreign Application Priority Data

Oct. 26, 2009 (DE) .......................... 10 2009 051 572
Oct. 26, 2009 (DE) .......................... 10 2009 051 573
Oct. 26, 2009 (DE) .......................... 10 2009 051 574

(51) Int. Cl.
*F16K 31/02* (2006.01)
*F16K 31/06* (2006.01)
*F16K 31/40* (2006.01)
*F16K 31/44* (2006.01)

(52) U.S. Cl.
CPC ........... *F16K 31/0658* (2013.01); *F16K 31/408* (2013.01); *F16K 31/44* (2013.01)
USPC .................... 251/129.15; 335/236; 335/281

(58) Field of Classification Search
USPC ............ 251/30.01, 129.07, 129.15; 335/236, 335/281
See application file for complete search history.

(56) References Cited

U.S. PATENT DOCUMENTS

| 5,271,599 | A | 12/1993 | Kolchinsky et al. |
| 6,601,822 | B2 * | 8/2003 | Tachibana et al. ....... 251/129.15 |
| 7,036,788 | B1 | 5/2006 | Schneider et al. |
| 7,172,171 | B2 * | 2/2007 | Doehla et al. ............ 251/129.15 |
| 8,469,334 | B2 * | 6/2013 | Yamagata et al. ....... 251/129.15 |
| 8,480,055 | B2 * | 7/2013 | Strauss et al. ............ 251/129.15 |
| 2005/0184843 | A1 * | 8/2005 | Huerta et al. ................. 335/256 |
| 2005/0269538 | A1 * | 12/2005 | Haynes et al. ............ 251/129.15 |

(Continued)

FOREIGN PATENT DOCUMENTS

DE 29 22 148 12/1980
DE 199 07 732 8/2000

(Continued)

*Primary Examiner* — Matthew W Jellett
(74) *Attorney, Agent, or Firm* — Roylance, Abrams, Berdo & Goodman, L.L.P.

(57) ABSTRACT

A solenoid valve for controlling a fluid has a first housing part (2) and an axial guide (3) facing inwards for an armature (4) that can be displaced in the axial guide (3) under the effect of a solenoid (5) that at least partially surrounds the exterior of the first housing part (2). A return spring (6) and a closing element (27) impact a valve closing element (7). A second housing part (9) is arranged coaxially to the first housing part (2). The first housing part (2) has a reduced wall portion (17) that faces inwards towards the armature (4) and the second housing part (9) and that effects a magnetic separation of the two housing parts (2, 9) to at least some extent.

12 Claims, 1 Drawing Sheet

(56) References Cited

U.S. PATENT DOCUMENTS

| | | | |
|---|---|---|---|
| 2011/0037006 A1* | 2/2011 | Zurke et al. | 251/129.15 |
| 2011/0284781 A1* | 11/2011 | Keller et al. | 251/129.15 |
| 2012/0199773 A1* | 8/2012 | Miura | 251/129.15 |
| 2012/0313022 A1* | 12/2012 | Godbillon | 251/129.15 |
| 2013/0193362 A1* | 8/2013 | Guggenmos et al. | 251/318 |
| 2013/0214187 A1* | 8/2013 | Moreno et al. | 251/129.15 |

FOREIGN PATENT DOCUMENTS

| | | | |
|---|---|---|---|
| DE | 102 55 740 | 6/2004 | |
| DE | 10 2006 055796 | 5/2008 | |
| DE | 10 2008 020855 | 9/2009 | |
| DE | 10 2008 032 727 | 1/2010 | |
| WO | WO-2009/130072 | * 10/2009 | F16K 31/06 |

* cited by examiner

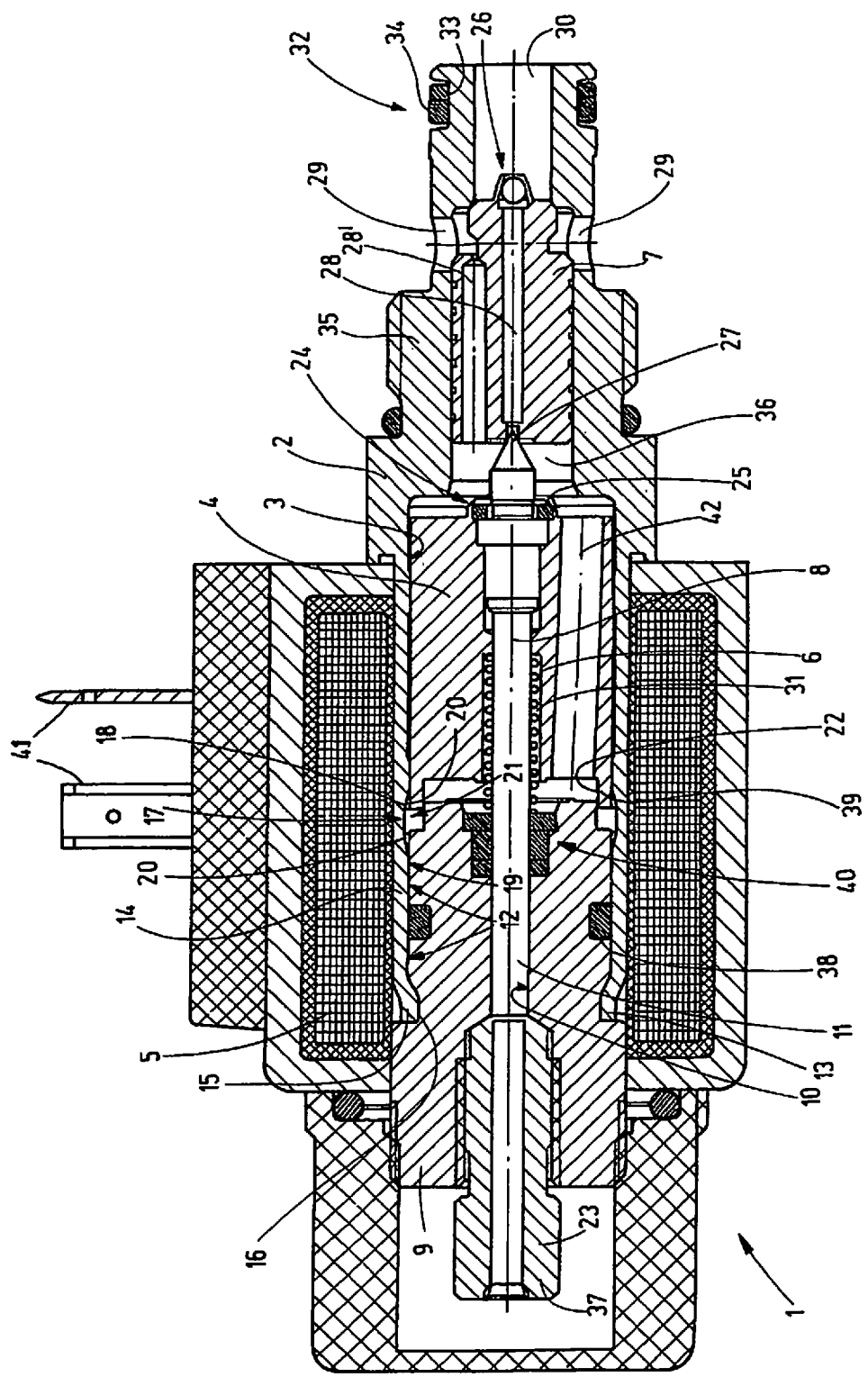

SOLENOID VALVE

REFERENCE TO RELATED APPLICATION

This application is a continuation of U.S. patent application Ser. No. 13/261,220 filed Mar. 16, 2012, the entire subject matter of which is incorporated herewith by reference.

FIELD OF THE INVENTION

The invention relates to a solenoid valve for controlling a fluid having a first housing part, with an axial guide oriented toward the interior for an armature that, under the action of a solenoid at least partially surrounding the first housing part to the outside, can be moved in the axial guide. A reset spring and a closing element acts on the valve closing member and has a second housing part located coaxially to the first housing part.

BACKGROUND OF THE INVENTION

DE-U-85 22 724 describes a solenoid valve with a first cylindrical housing part formed from a ferromagnetic material and a second, sleeve-shaped housing part that likewise is of a ferromagnetic material for accommodating a magnet armature controlling a valve seat body of the valve. For this purpose, the valve seat body has several hydraulic medium ports that, in the base position of the solenoid valve, are hydraulically separated from one another by a plunger attached to the magnet armature. The two housing parts themselves are magnetically separated from one another, but are physically connected by a ring-shaped, further housing part made of a nonmagnetic material in this respect. The magnetic separation by the further housing part serves among other things to oppose a magnetic short circuit in any case and to ensure effective feed of the magnetic lines of force into the magnetic armature if the actuating coil of the known solution is energized.

Due to the further housing part being of a nonmagnetic material, the known solution is, however, relatively expensive to implement for magnetic separation. Especially when the known solenoid valve is used at high pressures, a failure site is known to be formed by the other ring-shaped housing part for the magnetic separation.

To correct these disadvantages, DE 100 38 139 B4 has already proposed in a guide element of a magnetizable base material with at least one region of reduced magnetizability being implemented as an integral component of the base material. In one configuration of the known teaching, a circumferential groove is made in a pressure pipe suitable for solenoid valves and is provided with an additive material of reduced magnetizability by a laser application method or laser welding method, where austenitic materials are indicated as especially suitable, such as in particular nickel, chromium, and manganese. These laser treatment methods are also associated with a certain cost.

EP 0 951 412 B2 discloses a generic solenoid valve for the actuation of liquid and gaseous working media. This solenoid valve is usable especially for hydraulic brake systems for motor vehicles. The known solenoid valve has a first, preferably cylindrical, housing part surrounded by a solenoid and forming a receiver for an armature. The receiver forms an axial guide for the armature. An energy storage mechanism in the form of a reset spring acts on the armature together with a valve stem that acts on it and that, designed as a kind of valve closing member for a closing solenoid valve, presses on a valve seat interacting with corresponding fluid ports within the valve body. Coaxially to the first housing part, a second housing part has a cylindrical recess that extends in the longitudinal extension of the solenoid valve and that is connected to the valve ports and is located in the valve seat.

The first and second housing parts are each produced in one piece from a ferromagnetic material that surrounds the armature in the form of a thin-walled sleeve serving as a pole tube. The sleeve wall thickness remains the same over its length for reducing a magnetic short circuit and should be no greater than is necessary for reliable accommodation of the mechanical stress. The integral execution of the first housing part with the second housing part necessary in this respect is done preferably via metal cutting steps and can presuppose correspondingly high production and mounting accuracies.

SUMMARY OF THE INVENTION

An object of the invention is to provide an improved solenoid valve that is simple to produce and mount and that ensures reliable, effective magnetic separation to prevent short circuits.

This object is basically achieved by a solenoid valve where the first housing part is provided with a wall reduction that is oriented toward the interior in the direction of the armature and of the second housing part and that at least partially effects a magnetic separation of the two housing parts from one another. The wall reduction can be easily obtained using production technology, for example, using a rolling treatment tool or pressing tool. In particular, the solution according to the invention does not require the introduction of additive materials to help prevent a magnetic short circuit and to be able to effect magnetic separation to increase the efficiency of the magnetic system. As a result of the depression made from the interior and forming the wall reduction of the first housing part, the material of the wall of the housing is compressed in this respect so that even at higher compressive stresses, reliable steadying by the wall compression is achieved. Alternatively, the depression can be made by cutting so that the material is not compressed in this region.

For the purposes of this invention, the reference to a wall reduction expresses the fact that, viewed geometrically, a recess is on the inside of the wall of the housing part; but no weakening of the material in terms of a lack of compressive stiffness need be assumed. For one with average skill in the art in the field of solenoid valve technology, it is surprising that reliable magnetic separation is achieved with a wall reduction and still produces effective compressive steadying by the compression of the remaining wall thickness material. Even in the event of failure of the solenoid valve, high pressures can then still be reliably accommodated by parts of the magnetic housing relative to the fluid flow or flow of media.

The first housing part is preferably formed in the manner of a thin-walled sleeve as a pole tube in the region of the axial guide for the (magnet) armature, with the sleeve projecting into or beyond the second housing part. Because the first housing part in the overlapping region with the second housing part is constituted as a thin-walled sleeve, the first housing part can be fixed on the second housing part by a forming process, for example, by flanging, without the compressive stiffness of the overall device being adversely affected in the process.

Advantageously, a groove is around the outer circumference on the second housing part, with the edge of the first housing part be crimped into it. In addition to a compressively very strong connection of the first housing part to the second housing part, a sealing contact connection is also created in this way.

An especially reliable arrangement for the solenoid valve according to the invention is achieved if the wall reduction is provided in an overlapping region of the armature with the second housing part. A ring-shaped end of the armature overlaps a step-shaped shoulder on a side of the second housing part that is adjacent to the armature. Especially preferably, in a position spaced away from the armature to the housing part, a middle section of the groove in the sleeve overlaps an empty space in the overlapping region so that in this way, in addition to a magnetic decoupling, a reliable, power-guiding introduction of the magnetic lines of force into the armature can take place with the valve actuating part.

The individual components of the solenoid valve can also be more easily mounted owing to the simplified handling of two housing parts that are kept shorter in their axial length.

In one structurally advantageous version of the solenoid valve, in the region where the groove is located, the armature is formed as a cylinder that, in a traveling motion, partially crosses the second housing part formed as a piston in this region. Thus, regardless of its position, the piston is continuously in centered engagement with the first housing part.

One option of manually opening the solenoid valve in an emergency operation for a malfunction, for example, dictated by a failure of the solenoid, is enabled by a rod-shaped stem supported in the second housing part to be axially displaceable. It is able to be actuated from the outside by a set screw guided to be able to turn in the second housing part. The extension itself is provided with a radial widening on its one free end and, in this way, is secured to be axially immovable in the set screw. However, when the set screw or actuating screw is turned by hand, the stem can move the armature, and in this respect the tip, connected to the armature as a closing element, is lifted by the valve closing member. The closing element with its tip is inserted into the armature on its free end side and is held by a steel ring and a flange. Even for a tight armature, releasing the valve closing member is thus easily possible as soon as the rod-shaped stem with its widened end takes hold of the armature after an idle stroke. In the armature, the closing element itself can have a certain radial play so that even in the event of production-dictated alignment errors, the cone of the closing element with its free tip strikes the pilot seat on the valve closing member in the middle without difficulty.

In the valve member, a nonreturn valve is preferably installed that, together with the tip of the closing element, clears or closes a bypass bore in the valve closing member. The reset spring or another type of energy storage mechanism is preferably to be located in a recess in the armature around the stem. The assignment of the valve ports and the shape of the valve closing member can be configured such that flow through the solenoid valve in both directions is possible. The reset spring can be supported on the armature and the second housing part preferably to bring about a closed position of the valve closing member.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure:

FIG. 1 is a side elevational view of a solenoid valve according to an exemplary embodiment of the invention, not to scale.

DETAILED DESCRIPTION OF THE INVENTION

FIG. 1 is a longitudinal section through a solenoid valve 1 for controlling a fluid, such as a liquid working medium for a hydraulic consumer of a hydraulic system, which consumer is not detailed. The solenoid valve 1 is made as a piloted valve that can be activated electromagnetically. In its essential parts, the solenoid valve 1 comprises a cylindrical first housing part 2 with dimensions that change incrementally along its outer and inner diameter.

With its connecting branch 32, shown on the right edge in FIG. 1, having an O-ring 34 inserted into a circumferential groove 33, the first housing part 2 forms a fluidic connection to a hydraulic system (not shown), especially to a hydraulic consumer. The connecting branch 32 is part of a valve body 35 in whose axial region the first housing part 2 has a large wall thickness compared to its other wall regions. In this respect, the connecting branch 32 forms a type of cartridge valve. A valve port 29 extending radially in the valve body 35 from the two sides can be connected to its valve port 30 routed centrally and axially out of the connecting branch 32, where a valve closing member 7 made as a valve spool controls this fluid-carrying connection. The valve closing member 7 is made as a stepped spool and is axially actuated by a closing element with tip 27. The press fit 24 is created by a seal 25 in the manner of an O-ring fitting into corresponding receivers resting on the closing element and on the armature 4. The valve closing member 7, with its right edge shown in FIG. 1, forms a valve seat together with the bore constituting the valve port 30.

The conical closing element with its tip 27 rests in a first bypass bore 28 in the valve closing member 7 with its right free end. A second bypass bore 28' extending through the valve closing member 7 is spaced radially by a distance relative to the first bypass bore 28 projecting centrally through the valve closing member 7 and is arranged parallel to the first bypass bore 28. The second bypass bore 28' is connected to the valve port 29 to carry fluid via a corresponding throttle site. Likewise, the bypass bore 28 is connected via a throttle site to a rear pressure space 36, where the tip of the closing element in the operating position shown in the FIGURE mates with this throttle site. In this respect, the first bypass bore 28, with the tip 27 of the closing element removed, forms a fluid-carrying connection with respect to the rear pressure space 36 extending between magnet armature 4 and the facing end side of the valve closing member 7.

A nonreturn valve 26 is located on the end of the valve closing member 7 facing the valve port 30. In the direction of the FIGURE, on the left the first housing part 2 undergoes transition from the valve body 35 into a thin-walled sleeve 14 forming the pole tube within the solenoid valve. Furthermore, the sleeve 14 forms an axial guide 3 for the armature 4 over a length corresponding to about half its total length. A lubricating medium can be placed between the magnet armature 4 and the sleeve 14, or parts of the inner housing wall of the sleeve 14 are widened in their outside diameters relative to the other wall parts somewhat in diameter so that offset lubricating pockets form in which the fluid then forms a kind of sliding seal for the magnet armature 4.

The rod-shaped stem 8 extends through the piston-like armature 4 that can move depending on the energizing of a solenoid 5 surrounding the sleeve 14 in its essential length. The stem 8 is guided with an extension 11 through a recess 10 of a second housing part 9 whose free end region is adjoined by a set screw 23. Set screw 23 is rotationally guided by a corresponding inner screw connection in the second housing part 9. When a set screw head 37 with a knurl is turned, the stem 8 can be moved and can clear the valve closing member 7 via the armature 4 and the closing element that has been inserted into the armature 4 with tip 27 in the sense of an opening position. External cover caps can be removed from the other magnet housing parts for the corresponding emergency operation.

Like the first housing part 2, the second housing part 9 is essentially a cylindrical, one-piece body, with corresponding diameter adjustments along its outer side. The second housing part 9 is surrounded by the sleeve 14 of the first housing part 2 to approximately to half of the axial extension, forming a plug connection 12, with the second housing part 9 having a circumferential groove 16 into which an edge 15 of the sleeve 14 is crimped. The forming region 13 of the sleeve 14 in the longitudinal section is constituted as right-angle bend; i.e., after forming, the edge 15 comes to rest offset in parallel in the circumferential groove 16. This molding process can be carried out with a pressing tool or rolling treatment tool. An O-ring 38 between the sleeve 14 and the second housing part 9 in a groove of the second housing part 9 seals the first housing part 2 against the second housing part 9.

For magnetic separation of the two housing parts 2, 9, in the axial middle of the solenoid 5, the sleeve 14 is provided with a wall reduction 17 to approximately half of the other wall thickness of the sleeve 14. The wall reduction 17 is formed by a groove 18 with flanks 20 that extend flat on the inner circumference 19 of the sleeve 14. This wall reduction 17 encompasses the inner region of the sleeve 14 in the manner of a ring. The wall reduction 17 facilitates the magnetic separation, especially between the two housing parts 2, 9. The armature 4 is located in its forward position shown in the FIGURE. Between an annular end 39 of the armature 4 and an adjacent, assigned step-shaped shoulder on a side of the second housing part 9 adjacent to the armature 4, an empty space is formed in that forward position that further promotes the magnetic separation and allows a defined transition of the lines of force from the armature 4 to the housing part 9. With this type of production of the magnetic separation of the two housing parts 2, 9 from one another, no thermal loading of the components is necessary at all, such as, for example, in the known hard-facing of a nonmagnetic material. When the components are joined, stresses and material distortion that adversely affect the accuracy cannot then occur. The empty space can also be filled with fluid that can be accordingly displaced again in the travelling motion of the armature 4, for example, via the sliding seal of the armature 4.

A small radial play of the armature 4 is in the region of the wall reduction 17. In all other respects, the armature 4 with its ring-shaped end 22 is guided on the second housing part 9. In this way, in the overlapping region 21 a type of piston-cylinder arrangement is implemented and acts on the armature 4 to center it so that it is always supported in a guided manner on the second housing part 9 at its left and right free ends.

As an energy storage mechanism, a reset spring 6 is placed around the stem 8 in a cylindrical bore of the recess 31 that extends from the end 39 of the armature 4 that faces the second housing part 9. The reset spring 6 is supported on a seal arrangement 40 around the stem extension 11. The seal arrangement 40 is placed around the extension 11 in the manner of a gland packing and seals the stem 8 in turn to prevent loss of a hydraulic medium relative to the second housing part 9. In the intermediate space between the armature 4 and the second housing part 9, hydraulic media can appear that, via a longitudinal bore 42 in the armature, can traverse the armature 4 from its rear end side to the front end side in the direction of the pressure space 36 and vice versa. In this way, balancing of the hydraulic medium is achieved so that in the region of the armature 4 neither an overpressure nor an underpressure can build up that could otherwise lead to problems in the operation of the armature 4. The solenoid valve 1 furthermore has a shielding housing, especially around its solenoid 5, with appropriate plastic and elastomer material being used here. This magnet structure is conventional for solenoid valves and is not further detailed. To energize the solenoid 5, a plug 41 is used. The plug 41 is attached to the upper side wall of the valve housing for linking to a control and current supply unit, not detailed.

Flow can take place through the valve body 35 of the solenoid valve 1 both from the valve port 29 to the valve port 30 and also vice versa. In the energized state of the solenoid 5, the armature 4 and the closing element with tip 27, as well as the valve closing member 7, viewed in the direction of the FIGURE, are moved to the left against the reset force of the reset spring 6, with flow through the valve body 35 in both directions between the valve ports 29 and 30 then being possible.

In the unenergized state of the solenoid valve, however, flow of the hydraulic medium from the valve port 29 to the valve port 30 is prevented; but conversely there is the possibility that the fluid connection may exist between the valve port 30 and the valve port 29. For this flow direction from port 30 to port 29, however, the valve spool 7 must be pushed against the force of the reset spring 6. This pushing takes place, for example, at a pressure difference of about 1.5 bar (check function). As described, the solenoid 5 is not energized. With the solution according to the invention, a type of 2/2-way seat valve is then implemented that, magnetically actuated and piloted as a cartridge valve, can control pressures of even 350 bar and that is closed in the normal state and that, as shown, allows a return or reverse flow function.

While one embodiment has been chosen to illustrate the invention, it will be understood by those skilled in the art that various changes and modifications can be made therein without departing from the scope of the invention as defined in the appended claims.

What is claimed is:

1. A solenoid valve for controlling a fluid flow, comprising:
a first housing part having a thin-walled sleeve being a pole tube forming an axial guide oriented toward an interior thereof;
a solenoid at least partially surrounding said first housing part to an outside thereof;
an armature movably mounted in said axial guide under action of said solenoid;
a valve closing member being in said first housing part and being acted upon by a reset spring and a closing element;
a second housing part being located coaxially relative to said first housing part, projecting into said sleeve and being at least partially in contact with said sleeve; and
a wall thickness reduction in said first housing part oriented toward said interior thereof, said armature and said second housing part, said wall thickness reduction at least partially magnetically separating said first and second housing parts from one another and including a groove on an inner circumference of said sleeve.

2. A solenoid valve according to claim 1 wherein said groove comprises flat flanks extending to adjacent wall regions of said sleeve.

3. A solenoid valve according to claim 2 wherein
said wall thickness reduction is located in an overlapping region of said armature with said second housing part, said armature having a ring-shaped end overlapping a stepped-shaped shoulder on an end thereof adjacent said armature in said overlapping region.

4. A solenoid valve according to claim 3 wherein
a middle section of said groove in said sleeve overlaps an empty space in said overlapping region in a position of said armature spaced away from said second housing part.

5. A solenoid valve according to claim 1 wherein
said first and second housing parts are connected to one another by a plug connection in which said first housing part at least partially overlaps said second housing part in an axial direction of valve actuation, one free axial end of said first housing part having a flanged edge mating with a circumferential groove in said second housing part.

6. A solenoid valve according to claim 5 wherein
said first housing part comprises a valve body receiving said valve closing member, movement of said valve closing member clearing and blocking a fluid-carrying connection between first and second valve ports in said valve body in open and closed positions of said valve closing member, respectively.

7. A solenoid valve according to claim 1 wherein
said second housing part comprises a set screw dynamically connected to a stem of said closing element, said set screw being manually actuatable to move said armature to move said valve closing member to the open position of said valve closing member via an extension of said stem extending at least partially through an axially extending recess in said second housing part.

8. A solenoid valve according to claim 1 wherein
said valve member comprises a pilot system.

9. A solenoid valve according to claim 1 wherein
valve closing member comprises a through bore extending axially therein, said closing element being movable relative to said through bore to open and close one end thereof.

10. A solenoid valve according to claim 1 wherein
said thin-walled sleeve is a unitary, one-piece member of said first housing part.

11. A solenoid valve according to claim 10 wherein
said groove is spaced from said free end of said sleeve.

12. A solenoid valve according to claim 10 wherein
a free end of said thin-walled sleeve is deformed into an exterior groove on said second housing part.

\* \* \* \* \*